(No Model.) 2 Sheets—Sheet 1.
A. W. NEWELL.
COOKING OR HEATING ATTACHMENT FOR STEAM OR HOT WATER RADIATORS.
No. 366,678. Patented July 19, 1887.
FIG. I.
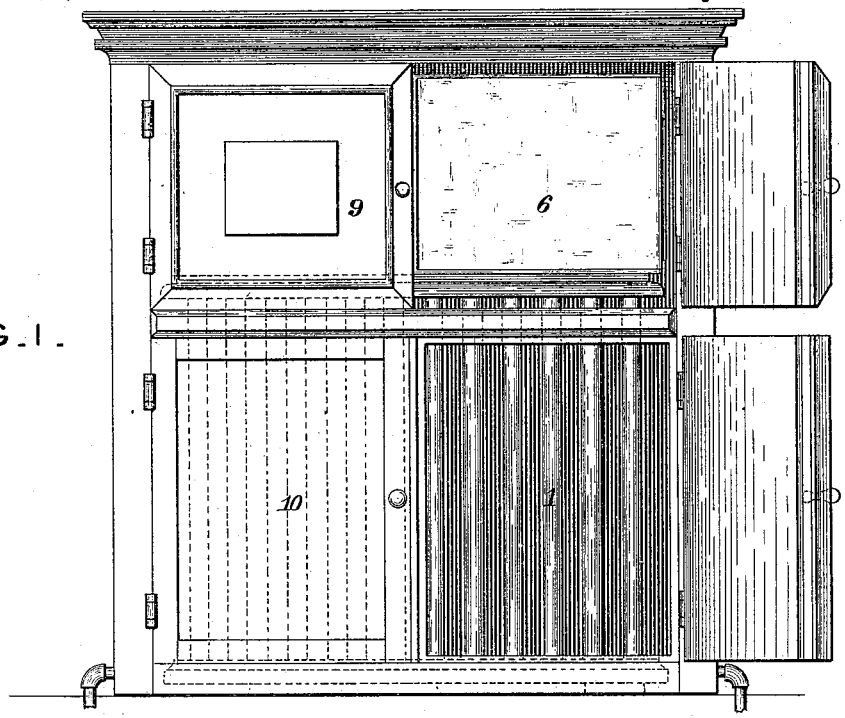
FIG. II.
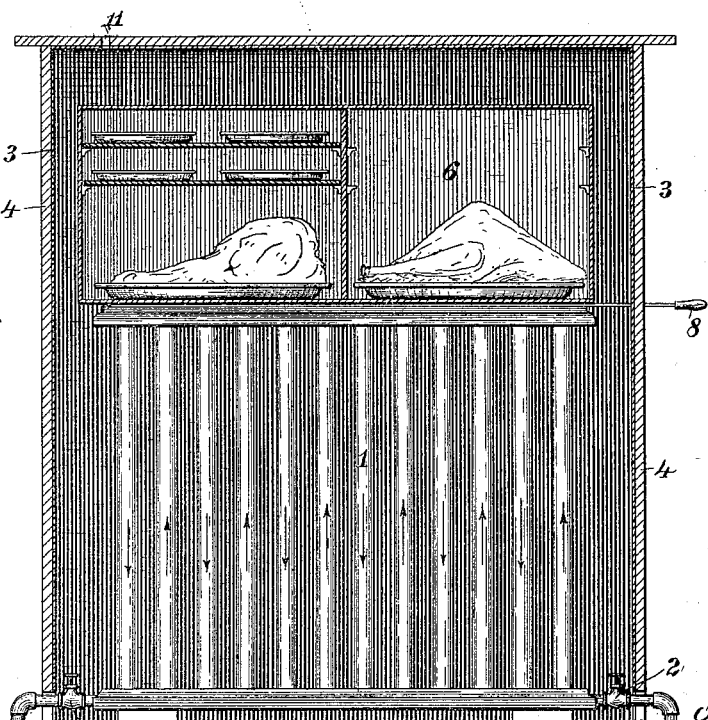
Attest:
Geo. T. Smallwood.
Edmund Starr.
Inventor:
Augustus W. Newell.
By Knight Bros. Attys.

(No Model.) 2 Sheets—Sheet 2.
A. W. NEWELL.
COOKING OR HEATING ATTACHMENT FOR STEAM OR HOT WATER RADIATORS.
No. 366,678. Patented July 19, 1887.
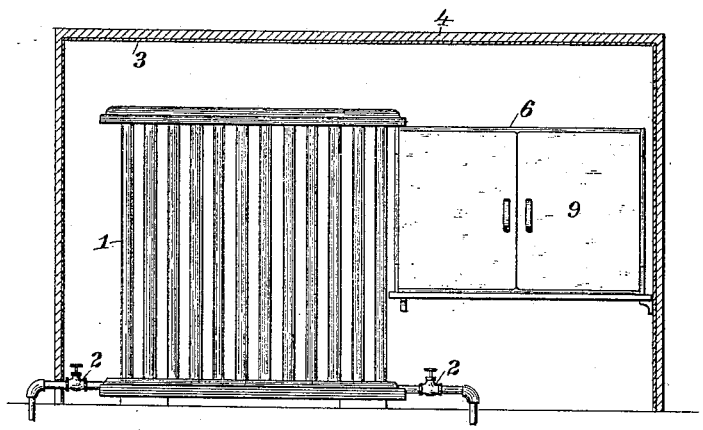
FIG. III.
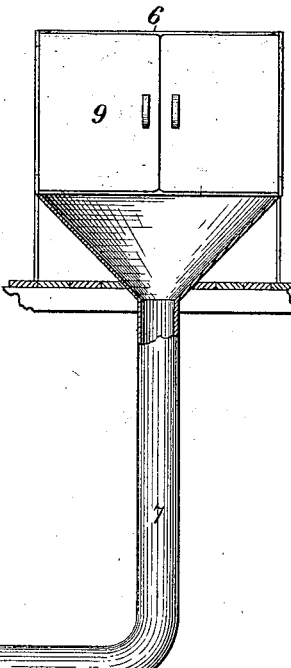
FIG. IV.
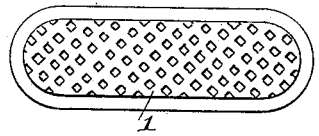
FIG. V.
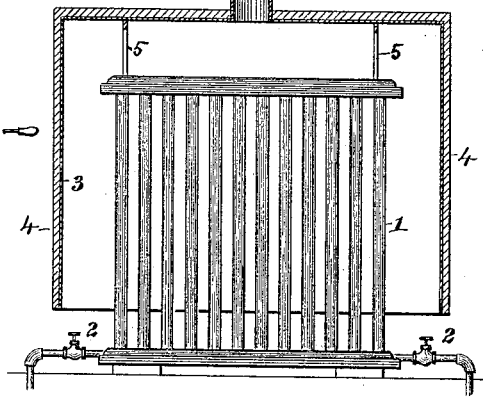
FIG. VI.
Attest.
Geo. T. Smallwood.
Edward Stern
Inventor.
Augustus W. Newell.
By Knight Bros.
Attys.

United States Patent Office.

AUGUSTUS W. NEWELL, OF BRADFORD, PENNSYLVANIA.

COOKING OR HEATING ATTACHMENT FOR STEAM OR HOT-WATER RADIATORS.

SPECIFICATION forming part of Letters Patent No. 366,678, dated July 19, 1887.

Application filed January 27, 1887. Serial No. 225,067. (No model.)

*To all whom it may concern:*

Be it known that I, AUGUSTUS W. NEWELL, a citizen of the United States, residing at Bradford, in the county of McKean and State of Pennsylvania, have invented certain new and useful Improvements in Cooking or Heating Attachments for Steam or Hot-Water Radiators, of which the following is a specification.

The object of my invention is to provide a radiator with an improved form of oven attachment, and relates to that construction of radiator which is provided with a jacket or covering.

My improvement consists in certain details of construction, as hereinafter described, and pointed out in the claims.

In order that my invention may be fully understood, I will describe it with reference to the accompanying drawings, in which—

Figure I is a front elevation of my improvement applied to a steam or hot-water radiator of ordinary construction, the doors on one side both of the radiator and oven portions being open. Fig. II is a vertical sectional view of the same. Fig. III is a vertical sectional view of a modified form of the invention, in which the oven is placed to one side of the radiator. Fig. IV is a partly-sectioned elevation of still another form in which the oven is placed in another apartment from the radiator. Fig. V represents in plan the top of a radiator conveniently used in connection with this invention. Fig. VI is a plan view of damper.

1 represents a steam or hot-water radiator of any ordinary or preferred construction, having regulating-cocks 2, and preferably a perforate top, as shown in Fig. V. A casing or jacket, preferably of metal, 3, and wood, 4, surrounds the radiator 1, so as to retain, if need be, all the heat therefrom. Instead of the kind of jacket shown, any other which will adequately retain the heat may be used. For example, the jacket may consist of two metal casings having an intervening air space. The jacket may be permanent, but is preferably made capable of ready removal. It may stand on the floor, as shown in Figs. I, II, and III, or may be supported by brackets 5, or otherwise, from the top of the radiator, as shown in Fig. IV.

6 is an oven or ovens, the sides of which form a sheet-metal box set within the jacket and resting over the perforate top of the radiator, as shown in Figs. I and II, or at one side of said radiator, as shown in Fig. III.

In still another form of the invention (shown in Fig. IV) the oven is placed in a separate apartment from the one containing the radiator, and receives the heated air therefrom by pipe 7.

8 is a damper used for cutting off the heat from the oven.

Doors 9 10 are provided in front of the oven and of the radiator, permitting access to the oven and to the valves of the radiator. To these doors and to the jacket or oven may be given any desired ornamental appearance, so that when the doors are closed the whole may resemble a cabinet or other handsome article of furniture.

11 is a hole made in the top of the jacket, Fig. II, to receive a thermometer-tube.

Having thus described my invention, the following is what I claim as new therein and desire to secure by Letters Patent:

1. The combination, with a steam or hot-water radiator having a jacket or covering, of an oven heated from the interior of the jacket or covering, substantially as described.

2. The combination, with a steam or hot-water radiator having a jacket or covering, of an oven supported within the covering or jacket, intermediate of the latter and the radiator, substantially as described.

3. The combination, with a steam or hot-water radiator, of the oven seated thereon and a jacket or covering surrounding the radiator and oven, provided with doors giving access to the radiator-valves and to the oven, substantially as described.

4. The combination, with a steam or hot-water radiator, of the oven seated thereover, a damper intermediate of the radiator and oven, and a jacket or covering surrounding the whole, provided with doors by which access is gained to the valves of the radiator and to the oven, substantially as described.

AUG. W. NEWELL.

Witnesses:
HARRY E. KNIGHT,
OCTAVIUS KNIGHT.